(12) United States Patent
Suzuki et al.

(10) Patent No.: US 10,608,510 B2
(45) Date of Patent: Mar. 31, 2020

(54) POWER SUPPLY TERMINAL STRUCTURE AND METHOD FOR ASSEMBLING MOTOR

(71) Applicant: DENSO CORPORATION, Kariya, Aichi-pref. (JP)

(72) Inventors: Yuuya Suzuki, Kariya (JP); Tatsuhiro Matsuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 349 days.

(21) Appl. No.: 15/541,233

(22) PCT Filed: Feb. 26, 2016

(86) PCT No.: PCT/JP2016/001048
§ 371 (c)(1),
(2) Date: Jun. 30, 2017

(87) PCT Pub. No.: WO2016/143289
PCT Pub. Date: Sep. 15, 2016

(65) Prior Publication Data
US 2017/0373566 A1  Dec. 28, 2017

(30) Foreign Application Priority Data

Mar. 11, 2015 (JP) .................................. 2015-048776
Feb. 9, 2016 (JP) .................................. 2016-023032

(51) Int. Cl.
*H02K 11/33* (2016.01)
*H02K 5/22* (2006.01)

(52) U.S. Cl.
CPC ............. *H02K 11/33* (2016.01); *H02K 5/22* (2013.01); *H02K 5/225* (2013.01)

(58) Field of Classification Search
CPC ........... H02K 5/225; H02K 5/22; H02K 11/33
(Continued)

(56) References Cited

U.S. PATENT DOCUMENTS 5,777,410 A * 7/1998 Asakura ............. B60H 1/00835
310/69
6,445,097 B1 * 9/2002 Zeiler ....................... B25F 5/02
310/71

(Continued)

FOREIGN PATENT DOCUMENTS

JP        H09219957 A     8/1997
JP        2013062923 A *  4/2013

*Primary Examiner* — Forrest M Phillips
(74) *Attorney, Agent, or Firm* — Harness, Dickey & Pierce, P.L.C.

(57) ABSTRACT

A power supply terminal structure includes: a circuit board; and a power supply terminal having a pair of terminal parts projected from the circuit board. The pair of terminal parts has: a retaining part that retains by clamping a terminal of a motor; a guide part located above the retaining part; and an elastic deformation part located below the retaining part. An interval between tip ends of the pair of terminal parts is increased as extending upward, and the guide part is displaced to increase the interval when the terminal of the motor is retained by the retaining part. The elastic deformation part is elastically deformable to displace a tip end of the guide part, and is curved to protrude in the width direction. The pair of terminal parts is separated from a convex part of the motor in a retaining state.

10 Claims, 5 Drawing Sheets

(58) Field of Classification Search
USPC .......................................................... 310/71
See application file for complete search history.

(56) References Cited

U.S. PATENT DOCUMENTS

| | | | |
|---|---|---|---|
| 7,402,926 B2 * | 7/2008 | Shinmura | H02K 5/08 |
| | | | 310/68 B |
| 7,548,001 B2 * | 6/2009 | Macaire | B60S 1/08 |
| | | | 310/71 |
| 8,659,198 B2 * | 2/2014 | Inoue | H02K 5/225 |
| | | | 310/71 |

* cited by examiner

POWER SUPPLY TERMINAL STRUCTURE AND METHOD FOR ASSEMBLING MOTOR

CROSS REFERENCE TO RELATED APPLICATIONS

This application is a U.S. National Phase Application under 35 U.S.C. 371 of International Application No. PCT/JP2016/001048 filed on Feb. 26, 2016 and published in Japanese as WO 2016/143289 A1 on Sep. 15, 2016. This application is based on and claims the benefit of priority from Japanese Patent Application No. 2015-048776 filed on Mar. 11, 2015 and Japanese Patent Application No. 2016-023032 filed on Feb. 9, 2016. The entire disclosures of all of the above applications are incorporated herein by reference.

TECHNICAL FIELD

The present disclosure relates to a power supply terminal structure disposed on a circuit board to supply electric power to a motor mounted on the circuit board, and a method of assembling the motor equipped with the power supply terminal structure.

BACKGROUND ART

Conventionally, in FIG. 2 of Patent Literature 1, a Y-shaped power supply terminal is used as a power supply terminal of a motor. The Y-shaped power supply terminal can deform by elastic deformation so that tip ends are displaced outward in a left-and-right direction. If a terminal of a motor is inserted from the upper side of the Y-shaped power supply terminal, the upper end portions of the power supply terminal are elastically deformed to separate from each other leftward and rightward. When the terminal of the motor is inserted to a portion of the power supply terminal curved to the outer side, the power supply terminal recovers its original shape due to the elastic power, such that the terminal of the motor is fixed by being clamped due to the elastic power.

PRIOR ART LITERATURES

Patent Literature

Patent Literature 1: JP H09-219957 A

SUMMARY OF INVENTION

A power supply terminal needs to be downsized, in response to a request downsizing a product in which a circuit board and a motor are brought close with each other. Then, inventors of the present disclosure study the downsizing of a power supply terminal using a prototype example shown in FIG. 8. First, as shown in (1) of FIG. 8, the height of the power supply terminal shown on the left side is made short to downsize the power supply terminal. Since a portion which carries out elastic deformation will also become small, the elastic power for holding a terminal of a motor also becomes small. In order to secure the elastic power in the state where the height is made short, it is necessary to extend the portion which carries out elastic deformation in a left-and-right direction, as shown in (2).

However, when the portion which carries out elastic deformation extends in the left-and-right direction, as shown in (3), the tip end portions also spread in the left-and-right direction. In this form, compression buckling is easily generated when the terminal of the motor contacts. The tip end of the power supply terminal functions as a guide part guiding the terminal of the motor. However, if the length of the guide part is increased in order to certainly make the terminal of the motor to contact the guide part, the tip end of the power supply terminal may contact a main part of the motor. Thus, the inventors found out an issue that it was difficult to simply miniaturize the power supply terminal.

The present disclosure is aimed to provide a power supply terminal structure downsized by reducing a distance between a terminal of a motor and a circuit board, and a method of assembling a motor equipped with the power supply terminal structure.

According to an aspect of the present disclosure, a power supply terminal structure that holds a terminal of a motor and that supplies electric power to the terminal of the motor includes: a circuit board; and a power supply terminal disposed on the circuit board and having a pair of terminal parts projected from the circuit board to supply electric power to the terminal of the motor. The motor has a convex part adjacent to the terminal and a rotation shaft. An end portion of the rotation shaft is projected from the motor oppositely from the convex part of the motor. Each of the terminal parts is elastically deformed independently relative to the circuit board, and tip ends of the pair of terminal parts are able to be displaced in a width direction. The pair of terminal parts has: a retaining part clamping and holding the terminal of the motor; a guide part located above the retaining part to guide the terminal of the motor to the retaining part, an interval between tip ends of the pair of terminal parts being increased as extending upward, the guide part being displaced to increase the interval when the terminal of the motor is being retained by the retaining part; and an elastic deformation part located below the retaining part to be elastically deformable to displace a tip end of the guide part, the elastic deformation part being curved to protrude in the width direction. The pair of terminal parts is separated from the convex part of the motor in the retaining state.

Thus, in the retaining state, the convex part of the motor and the pair of terminal parts are spaced from each other. Therefore, the convex part of the motor and the pair of terminal parts are in the spatial relationship not to interfere with each other. Accordingly, the downsizing is possible by reducing the distance between the terminal of the motor and the circuit board.

Further, in a method for assembling (manufacturing) a motor, the pair of terminal parts is separated from the convex part of the motor while the pair of terminal parts is being hold by the retaining part before the retaining state to the retaining state.

Specifically, the method of assembling the motor includes: displacing the pair of guide parts to increase an interval between the guide parts by the elastic deformation of the pair of elastic deformation parts by pushing the terminal downward to the pair of guide parts from the upper side; and retaining the terminal between the pair of retaining parts by further pushing downward along the pair of guide parts. The pair of terminal parts is separated from the convex part of the motor while the terminal of the motor is being hold by the pair of retaining parts before the retaining state to the retaining state.

Thus, the convex part of the motor is separated from the pair of terminal parts before the retaining state to the retaining state. Therefore, the convex part of the motor and the pair of terminal parts are in the spatial relationship not to interfere with each other during the assembling. Accordingly, the downsizing is possible by reducing the distance between the terminal of the motor and the circuit board.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
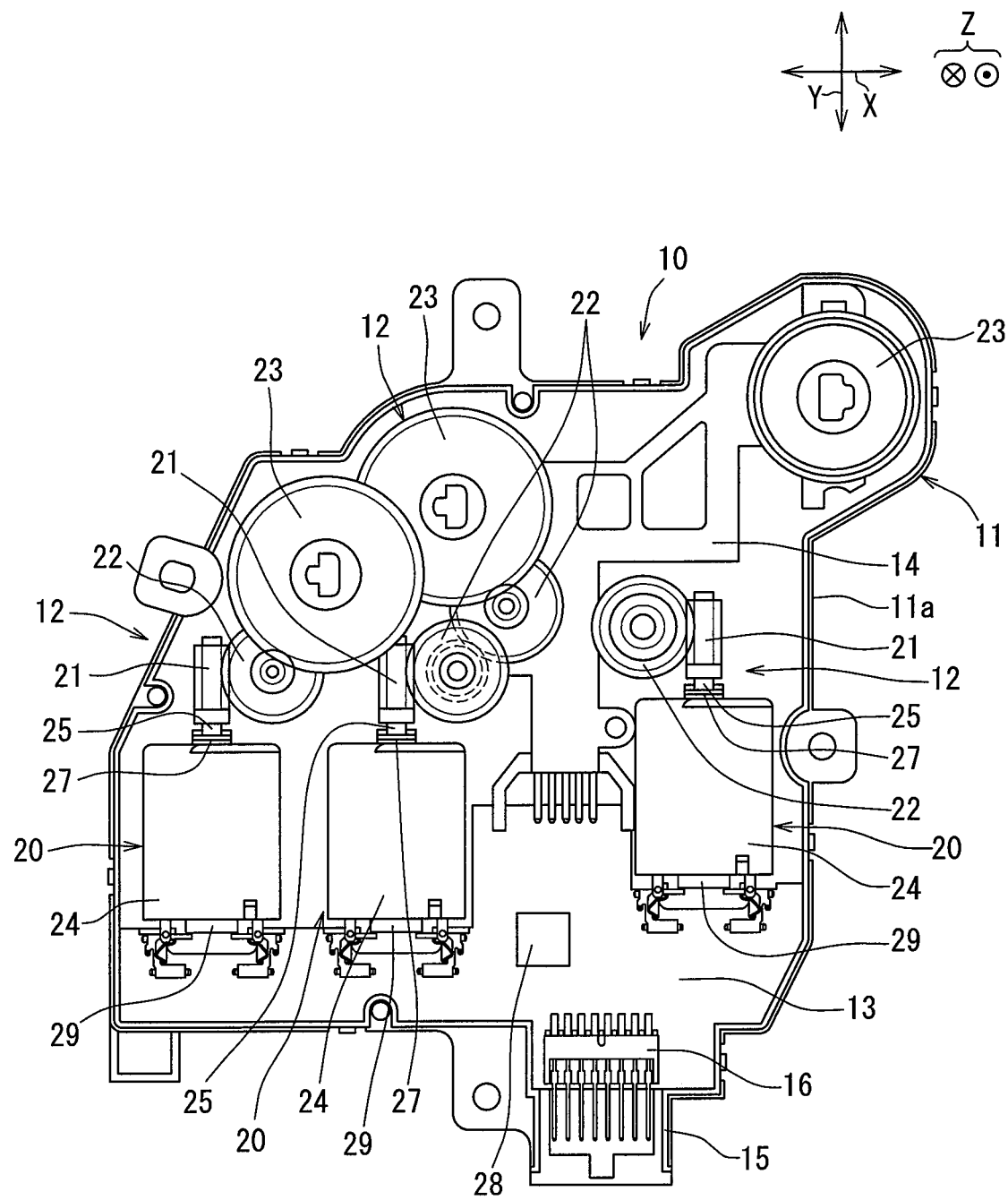
FIG. 1 is a view illustrating a motor actuator of a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A first embodiment is described using FIG. 1 to FIG. 5. A motor actuator 10 shown in FIG. 1 is disposed in an air-conditioner for a vehicle, and drives an air passage change door (not shown). The motor actuator 10 includes plural, three in this embodiment, output units 12 which output rotation, a circuit board 13, and a bus bar component 14, inside of a housing 11. The motor actuator 10 is a product in which the circuit board 13 and a motor 20 are united.

The housing 11 consists of two cases 11a stacked with each other to form a hollow box. Only one case 11a is shown in FIG. 1. The housing 11 is made of resin material. A connector formation part 15 is formed in the case 11a, and is projected outward from the case 11a. Plural connector terminals 16 are arranged in the connector formation part 15 to supply power to the motor actuator 10 and to input and output electric signals with an external equipment (not shown) mounted in the vehicle.

Next, the output unit 12 is explained. One output unit 12 is described, since the configuration is the same among the output units 12. The other output units 12 may be attached with the same mark and the explanation may be omitted. The output unit 12 includes the motor 20, a worm gear 21, a slowdown gear 22, and an output gear 23. The worm gear 21, the slowdown gear 22, and the output gear 23 are at least partially arranged in the housing 11 to transmit the rotation of the motor 20.

The motor 20 has a cylindrical housing case 24 where the both ends are closed. A rotation shaft 25 of the motor 20 is projected from the center of one end surface of the housing case 24 in the axial direction. A pair of terminals 26 for supplying electric power to the motor 20 is disposed on the other end surface of the housing case 24 in the axial direction. The motor 20 rotates the rotation shaft 25, when power is supplied from the terminal 26 of the motor 20.

A motor support part 27 for supporting the motor 20 is formed on the inner bottom of the housing 11. A power supply terminal 30 which supplies electric power to the terminal 26 of the motor 20 is formed on the inner bottom of the housing 11. The motor support part 27 supports the one end surface of the housing case 24 in the axial direction. The power supply terminal 30 supports the terminal 26 of the motor 20. Therefore, the motor 20 is supported by the housing 11 through the motor support part 27 and the power supply terminal 30.

The worm gear 21 is mounted to the rotation shaft 25 of the motor 20 to be rotatable integrally with the rotation shaft 25. The slowdown gear 22 is arranged near the worm gear 21 in the housing 11. The slowdown gear 22 has a large diameter gear shaped in a disk, and a small diameter gear formed integrally with the large diameter gear. The small diameter gear is shaped in a disk whose diameter is smaller than that of the large diameter gear. The small diameter gear is formed integrally with one end surface of the large diameter gear in the axial direction to have the same axis as the large diameter gear. The slowdown gear 22 is rotatably attached in the housing 11. The large diameter gear meshes with the worm gear 21.

The output gear 23 is arranged near the slowdown gear 22 in the housing 11. The output gear 23 is shaped in an approximately disk form, and an output shaft is formed at the central part of the output gear 23 in the radial direction. The output shaft is shaped in a pillar, and a connection concave portion is formed at the tip end surface. The output gear 23 is rotatably attached in the housing 11 in the state where the output shaft is oriented oppositely from the bottom. The output gear 23 meshes with the small diameter gear of the slowdown gear 22.

The output shaft is projected from an output hole formed in the housing 11 outward of the housing 11. A linkage mechanism (not shown) which operates the air passage change door is connected with a tip end part of the output shaft projected out of the housing 11. Therefore, the output shaft is connected with the air passage change door through the linkage mechanism. The linkage mechanism connected with the output shaft has a projection corresponding to the connection concave portion. The linkage mechanism is connected to the output shaft not to be rotatable relative to the output shaft, by inserting the projection into the connection concave portion.

A position detection sensor (not shown) for detecting the rotation position of the output gear 23 is mounted to the output gear 23 of the output unit 12. The position detection sensor is arranged between the output gear 23 and the bottom. The position detection sensor is electrically connected to the circuit board 13 through the bus bar component 14 arranged on the bottom in the housing 11, and outputs a pulse signal according to the rotation position of the output gear 23 through the bus bar component 14.

As shown in FIG. 1, when the motor 20 operates, the rotation of the rotation shaft 25 is transmitted to the worm gear 21, in the output unit 12. The rotation transmitted to the worm gear 21 is further transmitted in order of the slowdown gear 22 and the output gear 23 with slowing down. The rotation transmitted to the output gear 23 is outputted from the output shaft to drive the air passage change door through the linkage mechanism connected with the output shaft.

Figure 3:
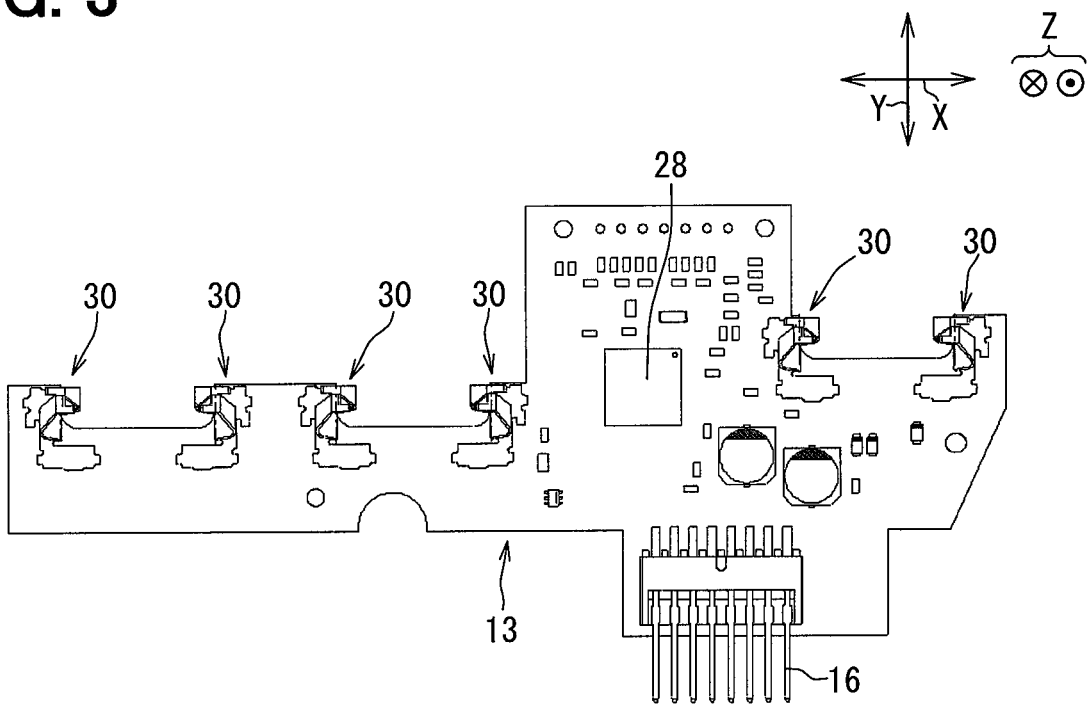
FIG. 3 is a view illustrating a circuit board.

The circuit board 13 shown in FIG. 3 is received in the housing 11. The circuit board 13 is shaped in a plate smaller than the bottom. The circuit board 13 is arranged in an area between the motor 20 and the connector terminal 16, and is fixed to the bottom.

The connector terminals 16 are electrically connected to the circuit board 13. The connector terminals 16 are electrically connected with an external connector (not shown) inserted in the connector formation part 15. The external connector allows the power supply to the motor actuator 10, and the communication with the external equipment mounted in the vehicle.

A pair of power supply terminals 30 for supplying electric power to the motor 20 is disposed on the circuit board 13. The pair of power supply terminals 30 is located near the other end of the motor 20 opposite from the rotation shaft 25 in the axial direction, and is electrically connected to the terminal 26 of the motor 20 by being fitted to the terminal 26 of the motor 20.

A drive IC 28 which controls the motor actuator 10 is mounted on the circuit board 13. The drive IC 28 controls the power supply to the motor 20 based on the electric signal inputted from the external equipment through the external connector and the electric signal inputted from the position detection sensor.

Figure 2:
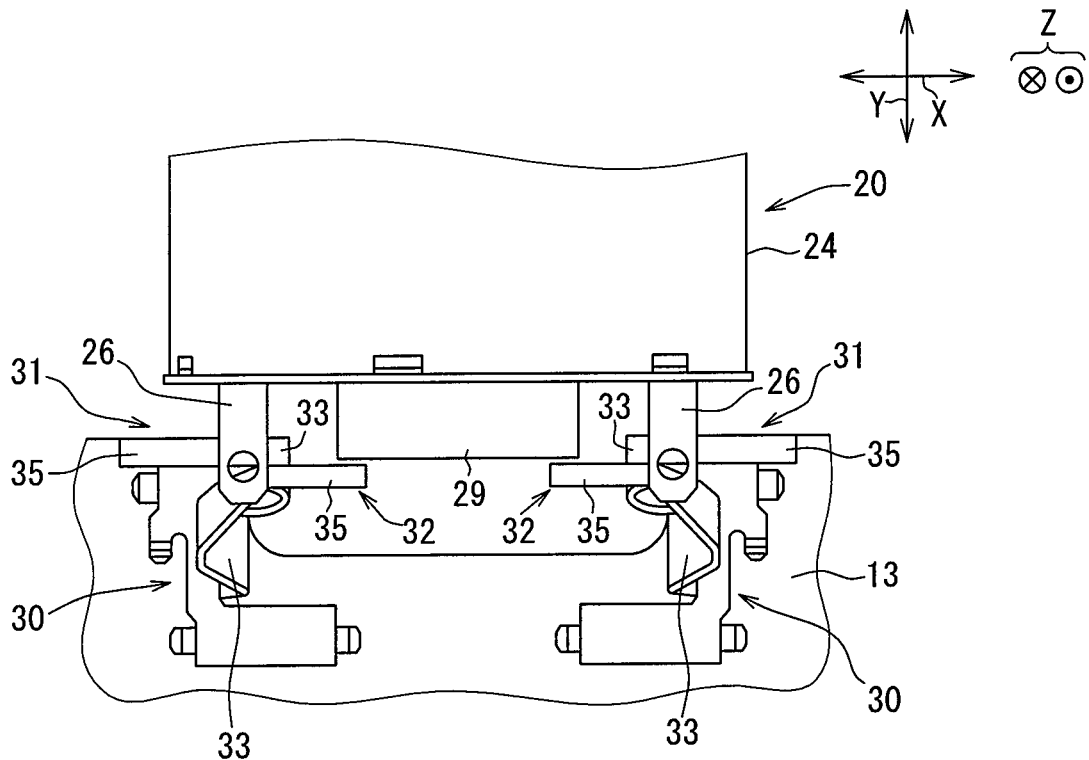
FIG. 2 is a view illustrating a power supply terminal.

Next, a power supply terminal structure is explained. The power supply terminal structure is a structure of the power supply terminal 30 which holds the terminal 26 of the motor 20 and which supplies electric power to the terminal 26 of the motor 20. As shown in FIG. 2, the motor 20 has two terminals 26. The power supply terminal 30 disposed on the circuit board 13 is electrically connected to each terminal 26 of the motor 20. Each terminal 26 of the motor 20 is shaped in a plate, and the terminals 26 are spaced from each other in the width direction X. The thickness direction of each terminal 26 of the motor 20 is approximately parallel to the height direction Z (up-and-down direction of FIG. 4) of the housing 11, and each terminal 26 extends in the rotational axis direction Y. The height direction Z can be said to be the thickness direction of the circuit board 13, and can also be said to be the longitudinal direction of the power supply terminal 30. The width direction X, the rotational axis direction Y, and the height direction Z are perpendicular to each other.

Figure 4:
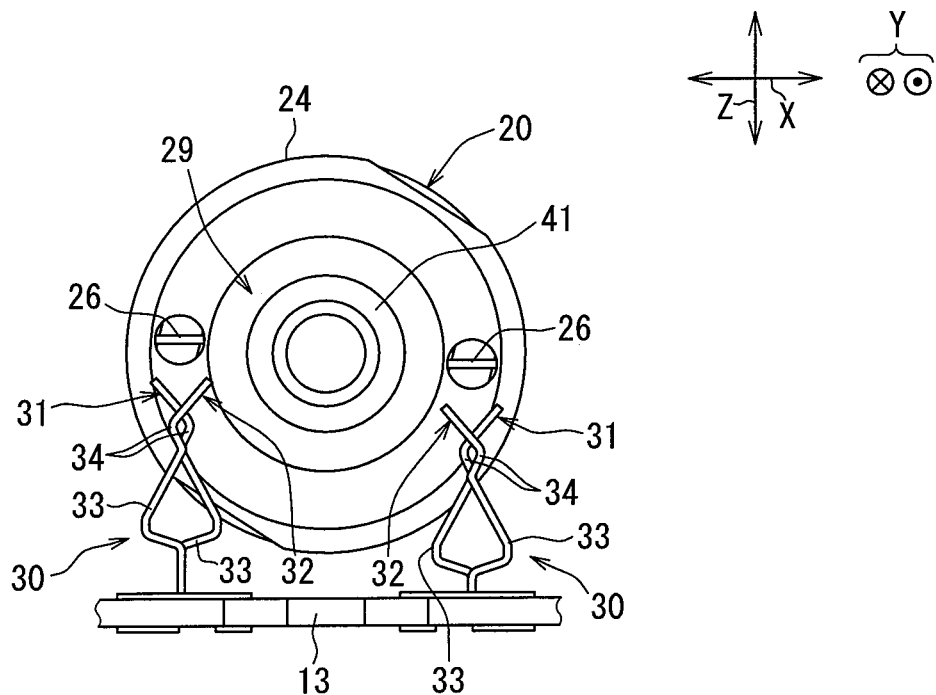
FIG. 4 is a view illustrating a state before a terminal of a motor is mounted to the power supply terminal.

As shown in FIG. 4, the power supply terminal 30 has a pair of terminal parts 31 and 32 projected from the circuit board 13. The pair of terminal parts 31 and 32 are electrically connected with the terminal 26 of the motor 20. Since the number of the motors 20 is three in the motor actuator 10 of this embodiment, the number of the terminals 26 of the motor 20 becomes six. As shown in FIG. 3, the number of the pair of terminal parts 31, 32 also becomes six.

The motor 20 has a convex part 29 adjacent to the terminal 26, and the end portion of the rotation shaft 25 of the motor 20 is projected on the opposite side of the convex part 29. A bearing which supports the end portion of the rotation shaft 25 of the motor 20, for example, is received in the convex part 29.

As shown in FIG. 3, the pair of terminal parts 31, 32 have approximately the same configurations. One pair of terminal parts 31, 32 is described, and the other pairs of terminal parts 31, 32 may be attached with the same mark and the explanation may be omitted. Each terminal part 31, 32 is elastically deformed independently relative to the circuit board 13, and the tip ends of the pair of terminal parts 31, 32 can be displaced in the width direction X (the left-and-right direction of FIG. 4). In other words, the pair of terminal parts 31 and 32 can be displaced in the width direction X away from each other to increase the interval between the tip ends. If a power displacing the tip ends of the pair of terminal parts 31 and 32 is canceled, the pair of terminal parts 31 and 32 will return the original position before applying the power to close the interval. The pair of terminal parts 31, 32 has an elastic deformation part 33, a retaining part 34, and a guide part 35 in this order from the lower side.

Figure 5:
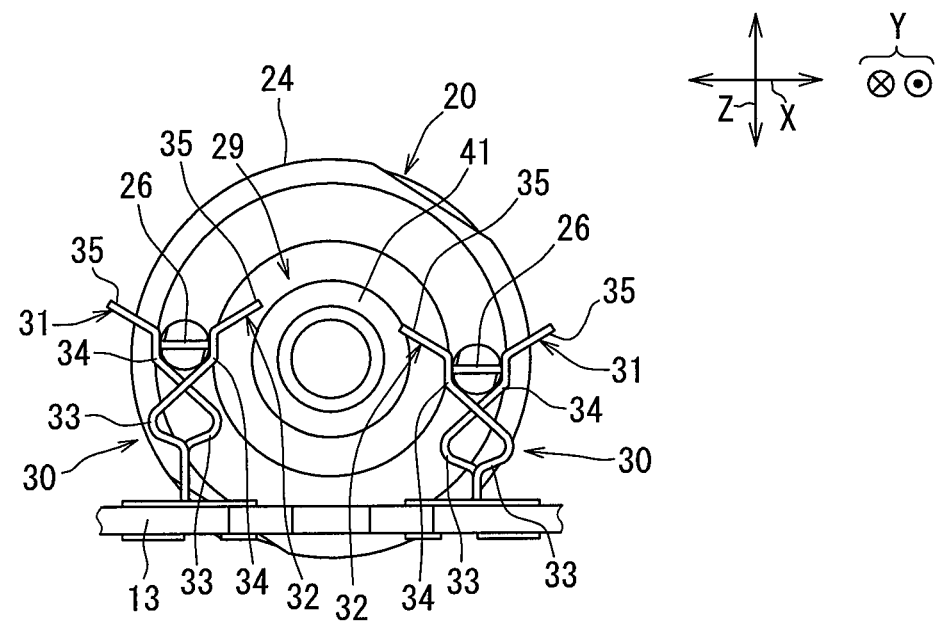
FIG. 5 is a view illustrating a state where the terminal of the motor is mounted to the power supply terminal.

The retaining part 34 clamps and holds the terminal 26 of the motor 20. The retaining part 34 presses the terminal 26 of the motor 20 from the both sides in the width direction X due to the elastic power of the elastic deformation part 33. Therefore, as shown in FIG. 4 and FIG. 5, the interval between the retaining parts 34 in the width direction X is larger in the retaining state than in the natural state.

The guide part 35 is located above the retaining part 34, and an interval between the guide parts 35 becomes larger as approaching the tip ends of the pair of terminal parts 31 and 32 (upward in FIG. 4). While the terminal 26 of the motor 20 is being held by the retaining part 34, the guide part 35 is displaced in the width direction X to increase the interval, and guides the terminal 26 of the motor 20 to the retaining part 34. Therefore, the terminal 26 of the motor 20 is brought close toward the pair of terminal parts 31 and 32 in the height direction Z from the state shown in FIG. 4 where the terminal 26 of the motor 20 and the pair of terminal parts 31 and 32 are aligned in the height direction Z. Then, even if the position of the terminal 26 of the motor 20 is deviated in the width direction X, the terminal 26 of the motor 20 contacts the guide part 35. Due to the inclination of the guide part 35, the terminal 26 of the motor 20 can be guided to the center of the pair of terminal parts 31 and 32 in the width direction X.

The elastic deformation part 33 is located below the retaining part 34, and is curved to protrude in the width direction X. The elastic deformation part 33 allows the elastic deformation to displace the tip end of the guide part 35. The elastic deformation part 33 produces the power of the retaining part 34 holding the terminal 26 of the motor 20. The elastic deformation part 33 is curved to be easily able to achieve elastic deformation. The elastic deformation part 33 can deform so that the tip ends of the guide part 35 are displaced away from each other in the width direction X.

In order to reduce the dimension in the height direction Z, the dimension of the pair of terminal parts 31, 32 in the width direction X is partially increased. First, the elastic deformation part 33 is enlarged in the width direction X. Therefore, as shown in FIG. 4, in the natural state before holding the terminal 26 of the motor 20, the elastic deformation part 33 is the largest in the width direction X, of the pair of terminal parts 31, 32. Thus, the elastic power is secured while the size of the pair of terminal parts 31, 32 is reduced in the height direction Z.

Therefore, the elastic power of holding the terminal 26 of the motor 20 can be certainly secured.

As shown in FIG. 5, in the retaining state in which the retaining part 34 retains the terminal 26 of the motor 20, the interval between the tip ends of the pair of terminal parts 31 and 32 is the largest in the width direction X, in the dimension of the pair of terminal parts 31, 32. Moreover, the interval between the tip ends of the pair of terminal parts 31 and 32 is larger than the dimension of the terminal 26 of the motor 20 in the width direction. Thus, the size of the guide part 35 is enlarged such that the terminal 26 of the motor 20 is certainly made in contact with the guide part 35 when the terminal 26 of the motor 20 is inserted in the retaining part 34.

As shown in FIG. 2, the pair of terminal parts 31 and 32 has a first terminal part 31 and a second terminal part 32 arranged in the rotational axis direction Y in which the rotation shaft 25 extends. The pair of terminal parts 31 and 32 is a general term of the first terminal part 31 which is one terminal part and the second terminal part 32 which is the other terminal part. As shown in FIG. 4, the first terminal part 31 and the second terminal part 32 are symmetry about a symmetry axis which passes the rotation shaft 25 and extends in the height direction Z, when seen in the rotational axis direction Y. The first terminal part 31 and the second terminal part 32 are formed by partially bending a band plate to be curved gently and sharply by press processing.

The first terminal part 31 is located adjacent to the motor 20 (upper side in FIG. 2). The second terminal part 32 is located away from the motor 20 (lower side in FIG. 2). The first terminal part 31 is curved so that the elastic deformation part 33 protrudes toward the convex part 29 of the motor 20 (right side in FIG. 2). The guide part 35 of the first terminal part 31 extends from the retaining part 34 on the opposite side away from the convex part 29 of the motor 20.

The second terminal part 32 is curved so that the elastic deformation part 33 protrudes on the opposite side away from the convex part 29 of the motor 20(left side in FIG. 2). The guide part 35 of the second terminal part 32 extends from the retaining part 34 toward the convex part 29 of the motor 20. A part of the guide part 35 of the second terminal part 32 overlaps with the convex part 29 of the motor 20 in the extending direction of the rotation shaft 25. Specifically, the tip end of the guide part 35 of the second terminal part 32 opposes the convex part 29 of the motor 20 in the rotational axis direction Y (the up-and-down direction in FIG. 2).

As shown in FIG. 2 and FIG. 5, the convex part 29 of the motor 20 and the pair of terminal parts 31 and 32 are separated from each other in the retaining state, due to such arrangement of the first terminal part 31 and the second terminal part 32. In other words, as shown in FIG. 2, the guide part 35 is arranged not to contact the convex part 29 of the motor 20. Specifically, as shown in FIG. 2, a part of the first terminal part 31 opposes the convex part 29 of the motor 20 in the width direction X (the left-and-right direction of FIG. 2). According to the present embodiment, in order to avoid interference between the convex part 29 of the motor 20 and the power supply terminal 30, the guide part 35 adjacent to the convex part 29 of the motor 20 is set to be displaced away from the motor 20.

Next, the assembling method of assembling the motor 20 is explained. Specifically, the method of assembling the terminal 26 of the motor 20 to the pair of terminal parts 31 and 32 is explained. As shown in FIG. 4, when the terminal 26 of the motor 20 is brought close toward the pair of terminal parts 31 and 32 in the height direction Z from the state where the terminal 26 of the motor 20 and the pair of terminal parts 31 and 32 are aligned in the height direction Z, the terminal 26 of the motor 20 contacts the guide part 35. At this time, the convex part 29 of the motor 20 and the pair of terminal parts 31 and 32 are spaced from each other. When being further brought close in the height direction Z, due to the inclination of the guide part 35, the terminal 26 of the motor 20 is guided to the center of the pair of terminal parts 31 and 32 in the width direction X. When the terminal 26 of the motor 20 is displaced downward at the center, the elastic deformation part 33 is elastically deformed, and the interval between the retaining parts 34 becomes large. Also at this time, the convex part 29 of the motor 20 and the pair of terminal parts 31 and 32 are distanced from each other. When being arranged at the position in the retaining state shown in FIG. 5, the terminal 26 of the motor 20 is clamped and held by the retaining part 34.

Thus, the tip end position of the guide part 35 is displaced, while the terminal 26 of the motor 20 is being retained by the retaining part 34 from the natural state to the retaining state. Meanwhile, the convex part 29 of the motor 20 is separated from the pair of terminal parts 31 and 32. Accordingly, the pair of terminal parts 31 and 32 can be arranged by using effectively the space on the outer side of the convex part 29 of the motor 20.

As explained above, according to the power supply terminal structure of this embodiment, the size of the elastic deformation part 33 is the largest in the natural state. Therefore, the elastic deformation power can be secured while the height of the pair of terminal parts 31 and 32 is reduced, such that the terminal 26 of the motor 20 can be certainly held by the retaining part 34. Moreover, in the retaining state, the interval between the tip ends of the pair of terminal parts 31 and 32 is the largest, as mentioned above, in the size of the pair of terminal parts 31 and 32 in the width direction X. Since the interval between the tip ends of the guide parts 35 is large, the terminal 26 of the motor 20 can certainly contact the guide part 35, and can be guided to the retaining part 34 smoothly by the guide part 35. A possibility of compression buckling caused when the terminal 26 of the motor 20 contacts the tip end of the guide part 35 can be reduced. Thus, since the height dimension of the pair of terminal parts 31, 32 is reduced, the distance between the terminal 26 of the motor 20 and the circuit board 13 can be reduced. Furthermore, the convex part 29 of the motor 20 is separated from the pair of terminal parts 31 and 32 in the retaining state. Therefore, the convex part 29 of the motor 20 and the pair of terminal parts 31 and 32 are in the spatial relationship not interfering with each other. Thus, the dimension can be reduced in the height direction Z to downsize by reducing the distance between the terminal 26 of the motor 20 and the circuit board 13.

Moreover, in this embodiment, a part of the first terminal part 31 opposes the convex part 29 of the motor 20 in the width direction X. Therefore, the space on the outer side of the convex part 29 of the motor 20 in the width direction X can be effectively utilized as a space for arranging the first terminal part 31. In this embodiment, the first terminal part 31 is arranged to oppose the convex part 29 in the width direction X. Alternatively, the second terminal part 32 may be arranged to oppose the convex part 29 in the width direction X, or both of the terminal parts 31 and 32 may be arranged to oppose the convex part 29 in the width direction X.

Moreover, in this embodiment, the guide part 35 of the first terminal part 31 located adjacent to the motor 20 extends away from the convex part 29 of the motor 20. Moreover, the guide part 35 of the second terminal part 32 located away from the motor 20 extends toward the convex part 29 of the motor 20. Therefore, the space for the convex part 29 of the motor 20 can be increased by the thickness of the first terminal part 31. Thus, the interval from the convex part 29 of the motor 20 to the pair of terminal parts 31 and 32 can be secured. Moreover, the dimension can be reduced in the rotational axis direction Y to downsize.

Furthermore, according to this embodiment, as shown in FIG. 2, a part of the guide part 35 of the second terminal part 32 opposes the convex part 29 of the motor 20 in the rotational axis direction Y. Therefore, while the pair of terminal parts 31 and 32 can be restricted from interfering with the convex part 29 of the motor 20, the space on the outer side of the convex part 29 of the motor 20 in the rotational axis direction Y can be used for a storage space of the second terminal part 32. Thus, the size can be reduced as a whole using effectively the space on the outer side of the convex part 29 of the motor 20.

(Second Embodiment)

Figure 6:
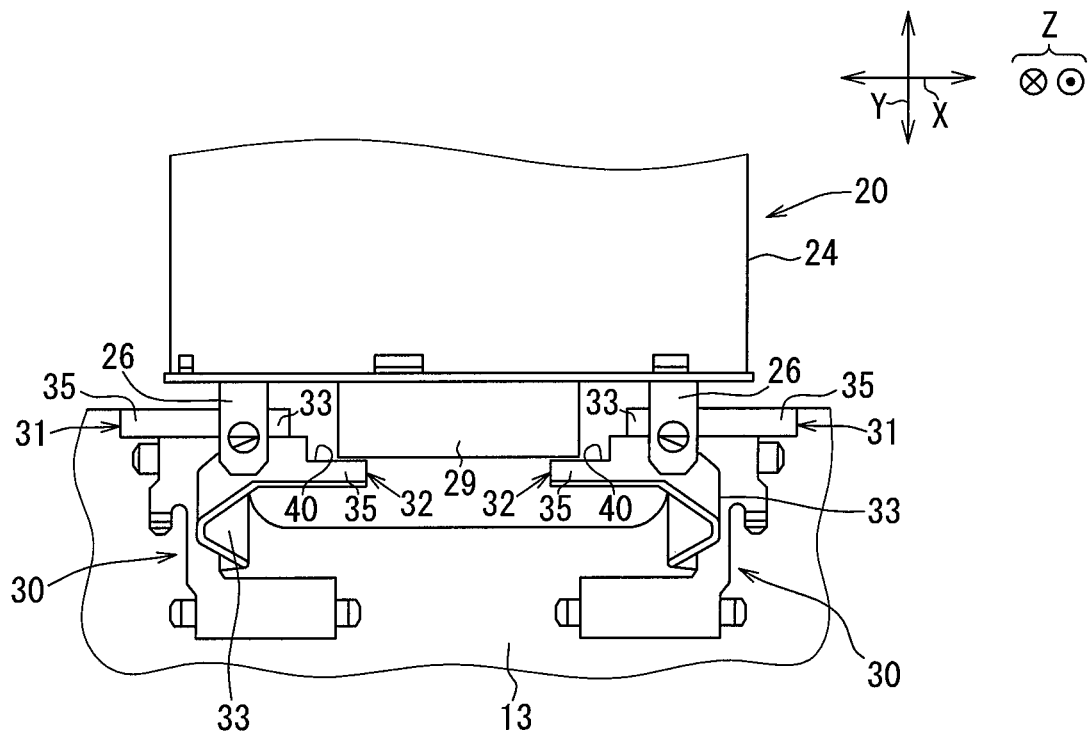
FIG. 6 is a view illustrating a power supply terminal of a second embodiment.

A second embodiment is described with reference to FIG. 6. In this embodiment, a cutout part 40 is formed at the tip end of the guide part 35 of the second terminal part 32. As shown in FIG. 6, the cutout part 40 is formed in a portion of the second terminal part 32 opposing the convex part 29 of the motor 20 in the rotational axis direction Y. The cutout part 40 is formed by partially cutting a part of the guide part 35 from the tip end in the rotational axis direction Y. In other words, the cutout part 40 is formed by preparing a step at the tip end of the guide part 35. The length of the cutout part 40 in the width direction X is suitably set depending on the size of the convex part 29 of the motor 20.

The size of the convex part 29 of the motor 20 will be large if the O ring 41 is disposed. A part of the O ring 41 is made to contact the housing 11 to fix the O ring 41 to the housing 11. If the convex part 29 of the motor 20 becomes large as such, the cutout part 40 can reduce interfering between the convex part 29 and the power supply terminal 30 of the motor 20. Therefore, if the motor 20 is equipped with the O ring 41, the power supply terminal 30 of this embodiment can achieve the downsizing while the terminal 26 of the motor 20 and the power supply terminal 30 are connected with each other.

The guide part 35 of the second terminal part 32 extends toward the convex part 29 of the motor 20 in this embodiment, but is not restricted to such configuration. The extending direction of the guide part 35 may be exchanged between the first terminal part 31 and the second terminal part 32. The guide part 35 of the first terminal part 31 may extend toward the convex part 29 of the motor 20. In this case, the cutout part 40 is formed in the guide part 35 of the first terminal part 31.

(Third Embodiment)

Figure 7:
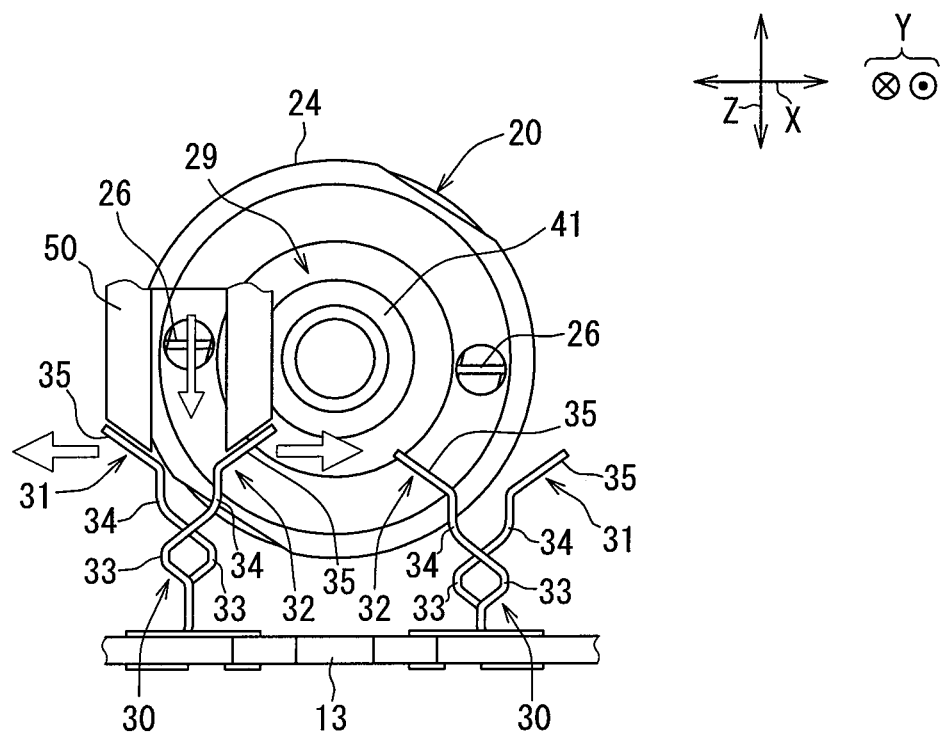
FIG. 7 is a view illustrating a power supply terminal of a third embodiment.
Figure 8:
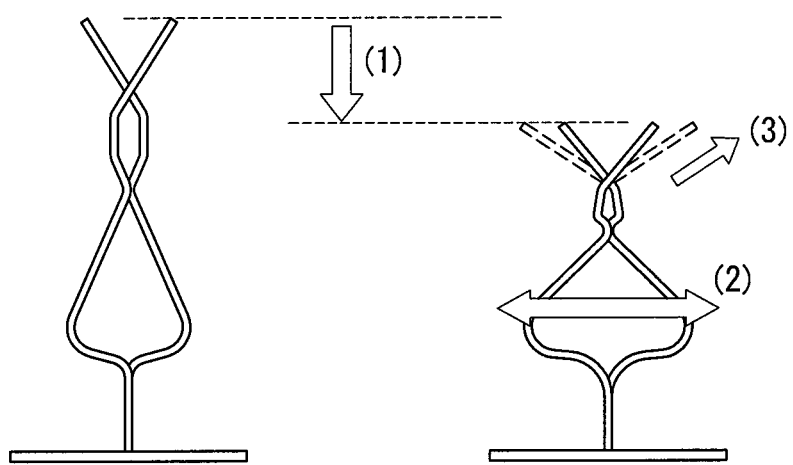
FIG. 8 is a view illustrating a power supply terminal of a prototype example.

A third embodiment is described with reference to FIG. 7. In this embodiment, the terminal 26 of the motor 20 is assembled to the power supply terminal 30 using a jig 50. As shown in FIG. 7, the assembling is performed after the guide part 35 of the pair of terminal parts 31 and 32 is displaced outward by the jig 50.

While the interval can be increased to be larger than the terminal width of the motor 20 by the jig 50, as mentioned above, the pair of terminal parts 31 and 32 is formed not to interfere with the convex part 29 of the motor 20. Therefore, if using the jig 50, the assembling can be completed while the pair of terminal parts 31 and 32 can be restricted from interfering with the convex part 29 of the motor 20. Thus, the assembling can be made easier. Therefore, plating peeling and compression buckling of the power supply terminal 30 can be prevented at the assembling time.

(Other Embodiment)

The present disclosure is not limited to the above-mentioned embodiments, and may have various modifications as described below without departing from the gist of the present disclosure.

The scope of the present disclosure is not limited to the range exemplified with the structure of the embodiment. The range of the present disclosure is shown by the appended claims, and also includes all the changes in the equivalence.

Although the power supply terminal structure is applied to the motor actuator 10 in the first embodiment, it is not restricted to the motor actuator 10. The power supply terminal structure can be applied to a contact portion between the terminal 26 of the motor 20 and the power supply terminal 30. Moreover, the motor 20 is not restricted to the motor for an air-conditioner for a vehicle to drive the air passage change door. The motor 20 may drive the other equipment.

What is claimed is:

1. A power supply terminal structure that holds a terminal of a motor and that supplies electric power to the terminal of the motor, the power supply terminal structure comprising:
   a circuit board; and
   a power supply terminal disposed on the circuit board and having a pair of terminal parts projected from the circuit board to supply electric power to the terminal of the motor, wherein
   the motor has a convex part adjacent to the terminal and a rotation shaft, an end portion of the rotation shaft being projected oppositely from the convex part of the motor,
   each of the terminal parts is elastically deformed independently relative to the circuit board, tip ends of the pair of terminal parts are able to be displaced in a width direction,
   the pair of terminal parts has
      a retaining part clamping and holding the terminal of the motor,
      a guide part located above the retaining part to guide the terminal of the motor to the retaining part, an interval between tip ends of the pair of terminal parts being increased as extending upward, the guide part being displaced to increase the interval when the terminal of the motor is retained by the retaining part, and
      an elastic deformation part located below the retaining part to be elastically deformable to displace a tip end of the guide part, the elastic deformation part being curved to protrude in the width direction both in a retaining state where the retaining part retains the terminal of the motor and in a natural state before the retaining part retains the terminal of the motor,
   the interval between the tip ends of the guide part having a width larger than a width of the retaining part and a width of the elastic deformation part, when the retaining part is in the retaining state,
   the elastic deformation part having a width larger than a width of the retaining part and a width of the guide part when the retaining part is in the natural state, and
   the pair of terminal parts is separated from the convex part of the motor in a the retaining state where the retaining part retains the terminal of the motor.

2. The power supply terminal structure according to claim 1, wherein
   the pair of terminal parts includes one terminal part and other terminal part arranged in an extending direction of the rotation shaft, and
   at least one of the one terminal part and the other terminal part of the pair of terminal parts opposes the convex part of the motor in the width direction.

3. The power supply terminal structure according to claim 1, wherein
   the pair of terminal parts includes one terminal part and other terminal part arranged in an extending direction of the rotation shaft, the one terminal part located adjacent to the motor has
the elastic deformation part curved to protrude toward the convex part of the motor, and
the guide part extending from the retaining part away from the convex part of the motor, and
the other terminal part located away from the motor has
the elastic deformation part curved to protrude away from the convex part of the motor, and
the guide part extending from the retaining part toward the convex part of the motor.

4. The power supply terminal structure according to claim 1, wherein
the pair of terminal parts includes one terminal part and other terminal part arranged in an extending direction of the rotation shaft,
the one terminal part has
the elastic deformation part curved to protrude toward the convex part of the motor, and
the guide part extending from the retaining part away from the convex part of the motor, and
the other terminal part has
the elastic deformation part curved to protrude away from the convex part of the motor, and
the guide part extending from the retaining part toward the convex part of the motor, and
a cutout part is formed at the tip end of the guide part.

5. The power supply terminal structure according to claim 1, wherein
the pair of terminal parts includes one terminal part and other terminal part arranged in an extending direction of the rotation shaft,
the one terminal part has
the elastic deformation part curved to protrude toward the convex part of the motor, and
the guide part extending from the retaining part away from the convex part of the motor,
the other terminal part has
the elastic deformation part curved to protrude away from the convex part of the motor, and
the guide part extending from the retaining part toward the convex part of the motor, and
a part of the guide part opposes the convex part of the motor in an extending direction of the rotation shaft.

6. The power supply terminal structure according to claim 1, wherein
the pair of terminal parts cross each other at a crossover point between the guide part and the retaining part, when the retaining part is in the natural state.

7. A method for assembling a motor including a terminal, a circuit board, and a power supply terminal disposed on the circuit board and having a pair of terminal parts projected from the circuit board to hold the terminal and to supply electric power,
the motor has a convex part adjacent to the terminal and a rotation shaft, an end portion of the rotation shaft being projected oppositely from the convex part of the motor,
the pair of terminal parts has
a pair of retaining parts clamping and holding the terminal of the motor,
a pair of guide parts formed at tip ends of the pair of terminal parts, an interval between the pair of guide parts being increased as extending upward, and
a pair of elastic deformation parts located below the pair of retaining parts to be elastically deformable, the pair of elastic deformation parts being curved to protrude in a width direction, the method comprising:
displacing the pair of guide parts to increase the interval by elastic deformation of the pair of elastic deformation parts by pushing the terminal downward to the pair of guide parts from an upper side; and
retaining the terminal between the pair of retaining parts by further pushing the terminal downward along the pair of guide parts, wherein
the pair of elastic deformation parts is curved to protrude in the width direction both in a retaining state where the pair of retaining parts retains the terminal of the motor and in a natural state before the pair of retaining parts retains the terminal of the motor,
the pair of elastic deformation parts has a larger width than the interval between the pair of guide parts ad width of the pair of retaining parts, when the pair of retaining parts is in the natural state,
the interval between the pair of guide parts has a larger width than the width of the pair of retaining parts and width of the pair of elastic deformation parts, when the pair of retaining parts is in the retaining state, and
the pair of terminal parts is separated from the convex part of the motor from the natural state to the retaining state while the terminal of the motor is being retained by the pair of retaining parts.

8. The method according to claim 7, wherein
the pair of terminal parts cross each other at a crossover point, the crossover point between the pair of guide parts and the pair of retaining parts.

9. A power supply terminal structure that holds a terminal of a motor and that supplies electric power to the terminal of the motor, the power supply terminal structure comprising:
a circuit board; and
a power supply terminal having a pair of symmetric terminal parts that are symmetric about a longitudinal axis of the power supply terminal, each of the pair of terminal parts having
an elastic deformation part that, in a natural state, extends orthogonally from the circuit board and along the longitudinal axis of the power supply terminal, bends at a first bend to extend substantially parallel to the circuit board in a width direction and away from the longitudinal axis, bends at a second bend and tapers toward the longitudinal axis before returning to the longitudinal axis, each of the elastic deformation parts forming a pair of elastic deformation parts,
a retaining part that, when the elastic deformation part is in the natural state, extends from the elastic deformation part, bends at a third bend to extend away from the longitudinal axis, bends at a fourth bend to extend toward the longitudinal axis before returning to the longitudinal axis, each of the retaining parts forming a pair of retaining parts, and
a guide part that, when the elastic deformation part is in the natural state, extends from the retaining part, extends past the longitudinal axis and away from the longitudinal axis before terminating at a tip, each of the guide parts forming a pair of guide parts, wherein
in response to the terminal engaging the pair of guide parts to exert a force on the pair of guide parts along the longitudinal axis, the pair of elastic deformation parts elastically deform from the natural state to a deformed state that urges the second bend in the pair of elastic deformation parts to move toward the longitudinal axis, urges the third bend and fourth bend in the pair of retaining parts to move toward and past the longitudinal axis to separate the pair of retaining parts for moving the terminal along the longitudinal axis for retention between the pair of retaining parts, and urges the pair of guide parts to move further away from the longitudinal axis, and wherein in response to the terminal being engaged between the pair of retention parts, the pair of elastic deformation parts return from the deformed state to a retention state that urges the second bend in the pair of elastic deformation parts to move away from the longitudinal axis thereby exerting a force on the pair of retaining parts to retain the terminal between the pair of retaining parts, and wherein when the pair of elastic deformation parts are in the natural state, a width of the pair of elastic deformation parts in the width direction is greater than a width of the pair of retaining parts and a width between the tips of the pair of guide parts, and wherein when the pair of elastic deformation parts are in the retaining state, the width between the tips of the pair of guide parts is greater than the width of the pair of elastic deformation parts and the width of the pair of retaining parts.

10. The power supply terminal structure of claim 9, wherein the pair of terminal parts cross each other at a crossover point, the crossover point between the pair of guide parts and the pair of retaining parts.

* * * * *